(12) United States Patent
Tanigawa et al.

(10) Patent No.: US 11,492,025 B2
(45) Date of Patent: Nov. 8, 2022

(54) RAILCAR FLOOR STRUCTURE

(71) Applicant: KAWASAKI RAILCAR MANUFACTURING CO., LTD., Kobe (JP)

(72) Inventors: Toshinobu Tanigawa, Kobe (JP); Takahiro Kawashima, Nishinomiya (JP); Yasuo Onitake, Akashi (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 430 days.

(21) Appl. No.: 16/646,297

(22) PCT Filed: Sep. 11, 2017

(86) PCT No.: PCT/JP2017/032725
§ 371 (c)(1),
(2) Date: Mar. 11, 2020

(87) PCT Pub. No.: WO2019/049386
PCT Pub. Date: Mar. 14, 2019

(65) Prior Publication Data
US 2020/0269884 A1 Aug. 27, 2020

(51) Int. Cl.
*B61D 17/10* (2006.01)
*B61D 27/00* (2006.01)

(52) U.S. Cl.
CPC ......... *B61D 17/10* (2013.01); *B61D 27/0045* (2013.01)

(58) Field of Classification Search
CPC ....... B61D 17/10; B61D 27/0045; B61F 1/00; H02G 3/00; H02G 3/04; H02G 3/0418; H02G 3/0437; H02G 3/30; H02G 3/383
See application file for complete search history.

(56) References Cited

U.S. PATENT DOCUMENTS

| | | | | |
|---|---|---|---|---|
| 5,321,203 A | * | 6/1994 | Goto | H01R 25/162 439/511 |
| 2012/0067862 A1 | * | 3/2012 | Anderegg | B61D 27/0045 219/202 |
| 2012/0234819 A1 | | 9/2012 | Berger | |

(Continued)

FOREIGN PATENT DOCUMENTS

| | | | | |
|---|---|---|---|---|
| CA | 2682789 A1 | * | 12/2010 | H02G 3/00 |
| DE | 11 2015 005 623 | | * 9/2017 | |

(Continued)

*Primary Examiner* — Mark T Le
(74) *Attorney, Agent, or Firm* — Oliff PLC

(57) ABSTRACT

A railcar floor structure includes: a plurality of floor panels arranged over an entire length of a passenger room of a railcar in a car longitudinal direction and including respective electric heaters; a wiring duct extending in the car longitudinal direction and arranged between a side bodyshell and car width direction end portions of the floor panels; an electricity supply cable arranged at the wiring duct, electric power being supplied to the electric heaters through the electricity supply cable; and a wire insertion opening formed at a side wall portion of the wiring duct, the side wall portion being located close to the floor panels and extending along the car longitudinal direction, the electricity supply cable passing through the wire insertion opening.

10 Claims, 5 Drawing Sheets

(56) References Cited

U.S. PATENT DOCUMENTS

| | | | | |
|---|---|---|---|---|
| 2013/0340364 A1* | 12/2013 | Haselmeier | ............... | E04C 2/52 |
| | | | | 52/220.2 |
| 2014/0305697 A1* | 10/2014 | Hudson | ................... | H02G 1/06 |
| | | | | 174/72 A |
| 2015/0090152 A1* | 4/2015 | Hirashima | ............. | B61D 17/08 |
| | | | | 105/396 |
| 2016/0273801 A1* | 9/2016 | Kapila | ................... | F24H 3/002 |

FOREIGN PATENT DOCUMENTS

| JP | H01-063090 U | 4/1989 |
|---|---|---|
| JP | H04-55464 U | 5/1992 |
| JP | 2012-527368 A | 11/2012 |
| JP | 2013-511021 A | 3/2013 |

\* cited by examiner

RAILCAR FLOOR STRUCTURE

TECHNICAL FIELD

The present invention relates to a railcar floor structure including a heater-equipped floor panel.

BACKGROUND ART

There exists a railcar floor structure configured such that a plurality of floor panels including heaters are laid over the entire length of a car body in a longitudinal direction for heating of a passenger room (see PTL 1, for example).

CITATION LIST

Patent Literature

PTL 1: Published Japanese Translation of PCT Application No. 2013-511021

SUMMARY OF INVENTION

Technical Problem

According to heater-equipped floor panels disclosed in PTL 1, since electric wires extend from lower surfaces of the floor panels, wire connecting work and floor panel laying work need to be performed at the same time. Therefore, the wire connecting work becomes complex, and when the wire has trouble, the floor panel needs to be detached once for access to the wire. In addition, a space in which a plurality of electric wires extending from the floor panels are collected and arranged needs to be provided under a floor. Further, even when electric wires for electricity supply extend from side surfaces or upper surfaces of the floor panels, a place where the electric wires are introduced to a space under the floor is restricted, so that the electric wires are, for example, extended to a ceiling, which causes a problem that the arrangement of the wires becomes complex.

An object of the present invention is to provide a railcar floor structure configured such that: wire arranging work and maintenance work of heater-equipped floor panels are easy; and a special wire space under a car floor is unnecessary.

Solution to Problem

A railcar floor structure according to one aspect of the present invention includes: a plurality of floor panels arranged over an entire length of a passenger room of a railcar in a car longitudinal direction and including respective electric heaters; a wiring duct extending in the car longitudinal direction and arranged between a side bodyshell and car width direction end portions of the floor panels; an electricity supply cable arranged at the wiring duct, electric power being supplied to the electric heaters through the electricity supply cable; and a wire insertion opening formed at a side wall portion of the wiring duct, the side wall portion being located close to the floor panels and extending along the car longitudinal direction, the electricity supply cable passing through the wire insertion opening.

According to the above configuration, the wiring duct is arranged between the side bodyshell and the car width direction end portions of the floor panels, and the electricity supply cable is arranged at the wiring duct and passes through the wire insertion opening of the side wall portion of the wiring duct to be introduced to the floor panel. Therefore, wire arranging work can be performed at the wiring duct located at one side of the floor panels and extending in the car longitudinal direction. Thus, wire arranging work and maintenance work of the heater-equipped floor panels can be easily performed. Further, since the electricity supply cable is arranged at the wiring duct located at one side of the floor panels, a special wire space under a car floor is unnecessary.

Advantageous Effects of Invention

The present invention can provide the railcar floor structure configured such that: wire arranging work and maintenance work of the heater-equipped floor panels are facilitated; and a special wire space under a car floor is unnecessary.

DESCRIPTION OF EMBODIMENTS

Hereinafter, embodiments will be described with reference to the drawings.

Embodiment 1

Figure 1:
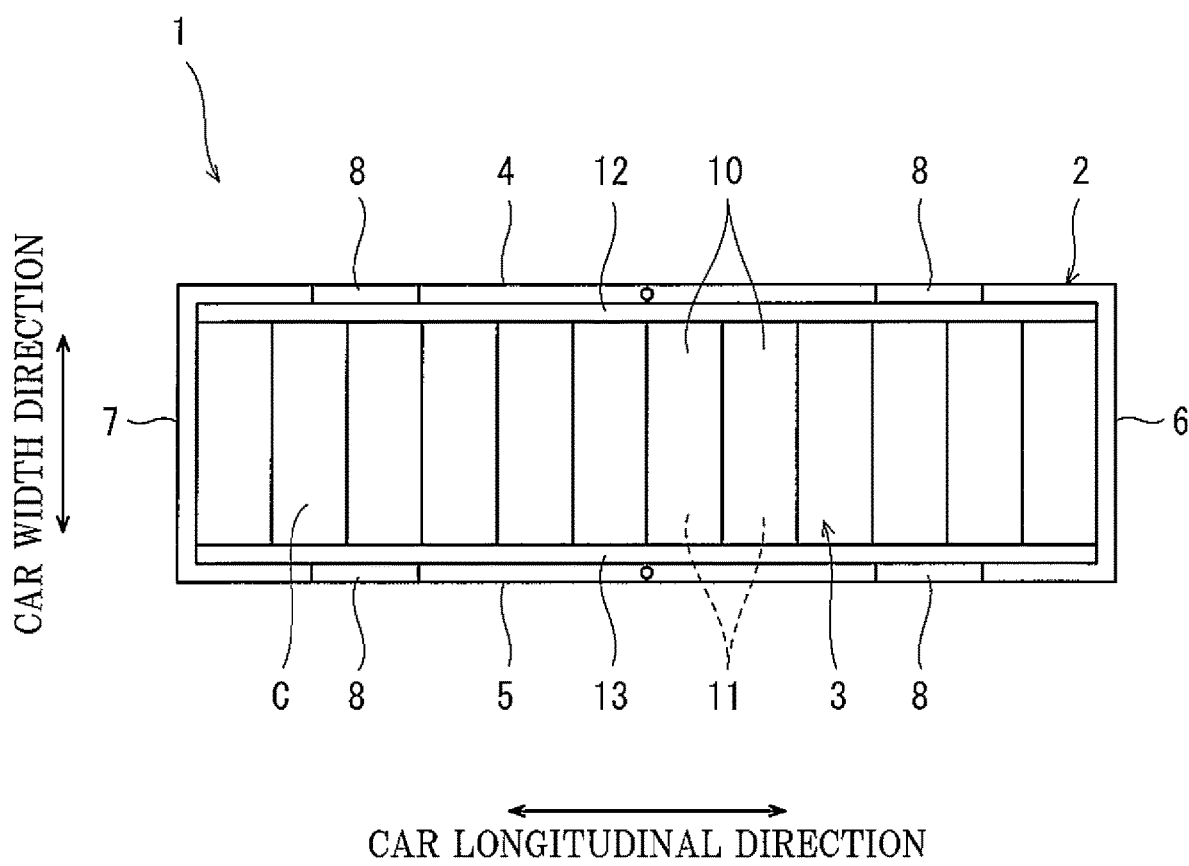
FIG. 1 is a plan view schematically showing a floor structure and the like of a railcar according to Embodiment 1.

FIG. 1 is a plan view schematically showing a floor structure 3 and the like of a railcar 1 according to Embodiment 1. As shown in FIG. 1, the railcar 1 includes a car body 2 in which a passenger room C is formed. The passenger room C is a space where passenger seats are arranged. The passenger room C does not include other spaces (such as entrance spaces at longitudinal direction end portions of the car body) that are separated from the above space. The car body 2 includes: an underframe 14; a first side bodyshell 4 and second side bodyshell 5 extending upward from both respective car width direction end portions of the underframe 14; a first end bodyshell 6 and second end bodyshell 7 extending upward from both respective car longitudinal direction end portions of the underframe 14; and a roof bodyshell (not shown) connected to upper end portions of the side bodyshells 4 and 5 and upper end portions of the end bodyshells 6 and 7. The side bodyshells 4 and 5 include door opening portions 8 at positions that overlap a position of the passenger room C in a car longitudinal direction. It should be noted that after the side bodyshells 4 and 5, the underframe 14, the end bodyshells 6 and 7, and the roof bodyshell are coupled to each other, the floor structure 3 is attached to the underframe 14.

The floor structure 3 includes a plurality of floor panels 10 continuously arranged over the entire length of the passenger room C in the car longitudinal direction. The floor panels 10 include therein respective electric heaters 11. In a plan view, each of the floor panels 10 has a rectangular shape extending from one side of the floor structure 3 to the other side in a car width direction. A first wiring duct 12 is arranged in the floor structure 3 so as to be located between the first side bodyshell 4 and first car width direction end portions of the floor panels 10. A second wiring duct 13 is arranged so as to be located between the second side bodyshell 5 and second car width direction end portions of the floor panels 10. The wiring ducts 12 and 13 extend over the entire length of the passenger room C in the car longitudinal direction. It should be noted that each of the wiring ducts 12 and 13 is configured by coupling a plurality of ducts to each other in the car longitudinal direction due to various reasons. However, each of the wiring ducts 12 and 13 may be a single duct extending over the entire length in the car longitudinal direction.

Figure 2:
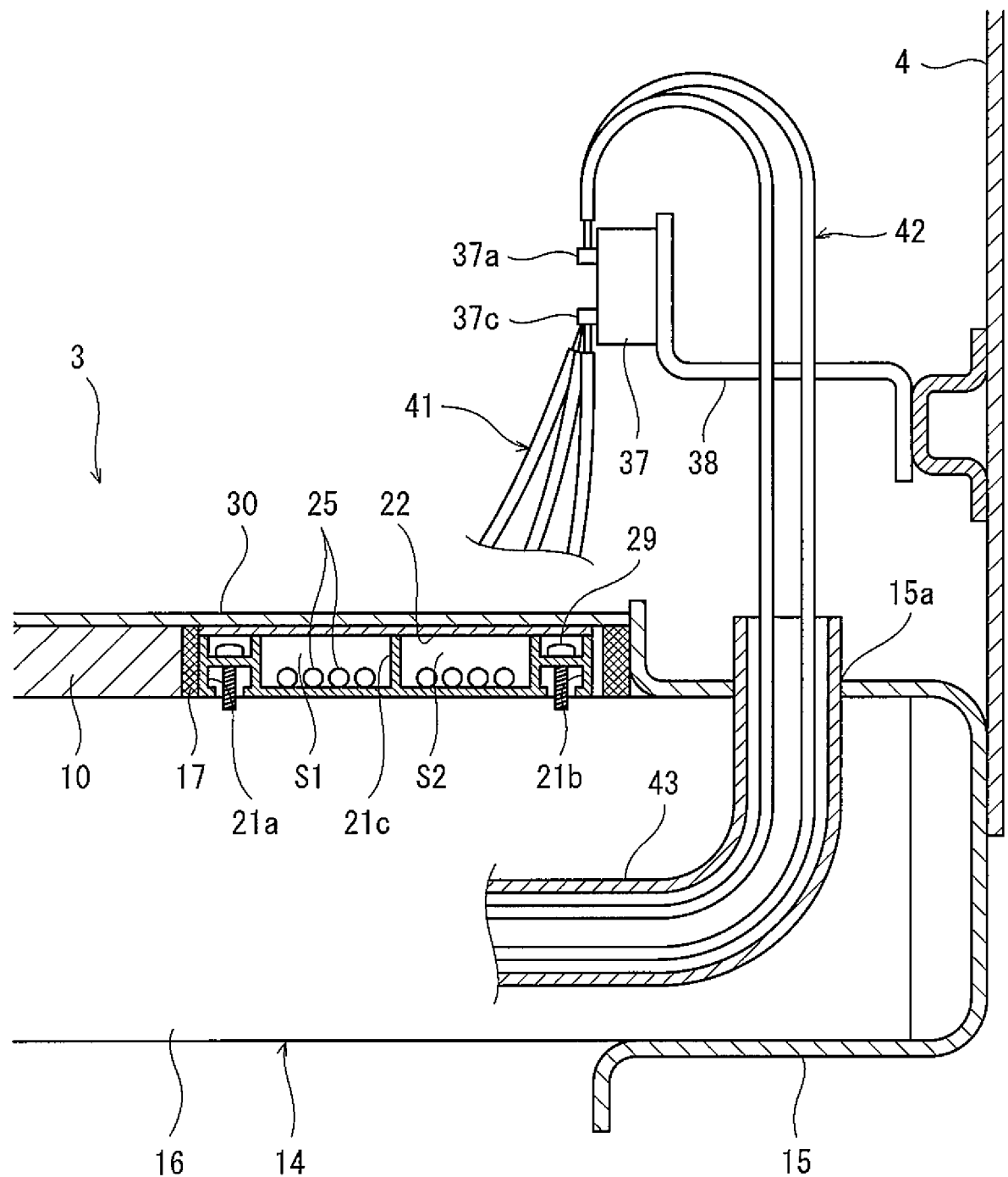
FIG. 2 is a sectional view showing major components of the floor structure shown in FIG. 1.
Figure 3:
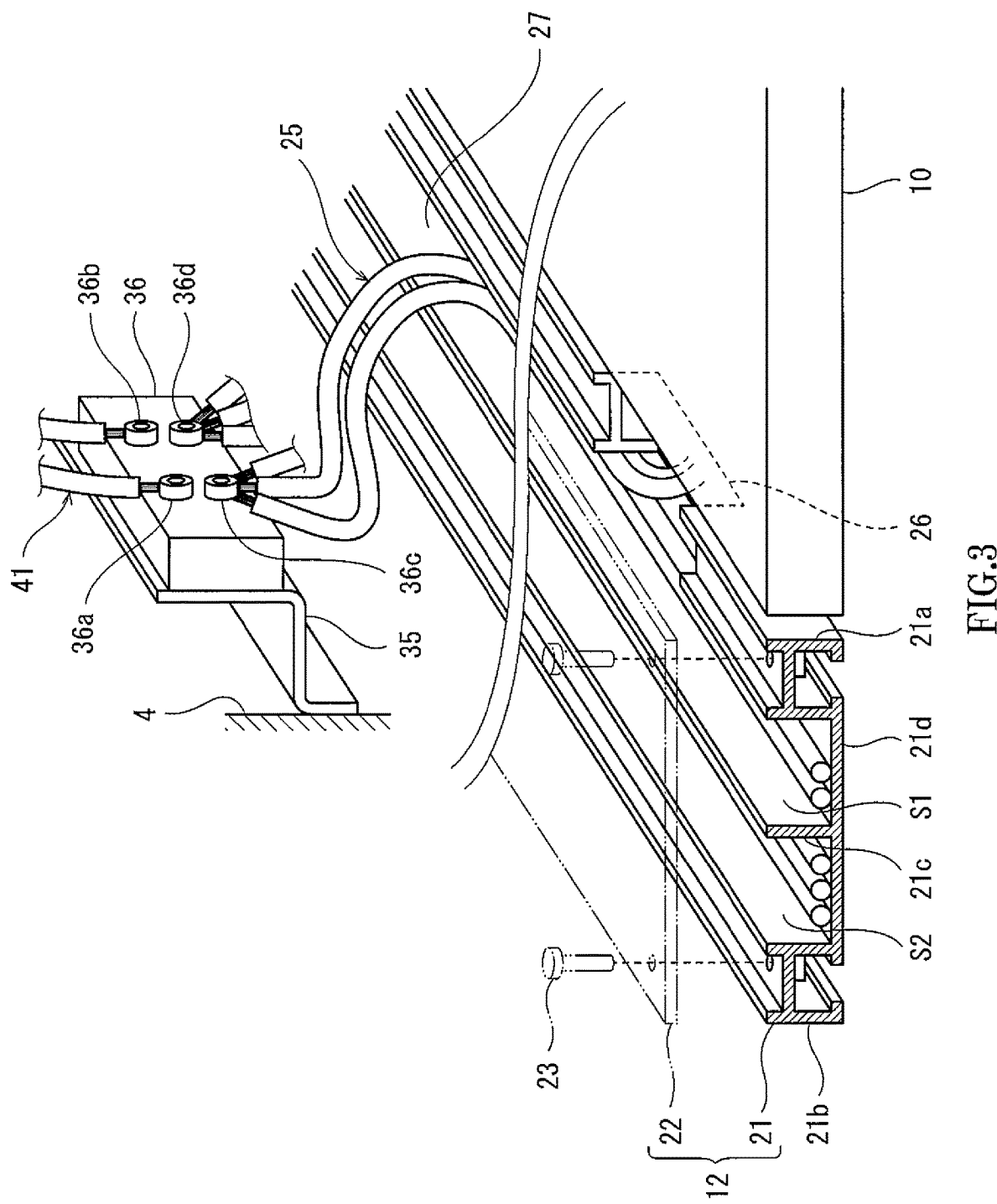
FIG. 3 is a perspective view showing major components of the floor structure shown in FIG. 2.
Figure 4:
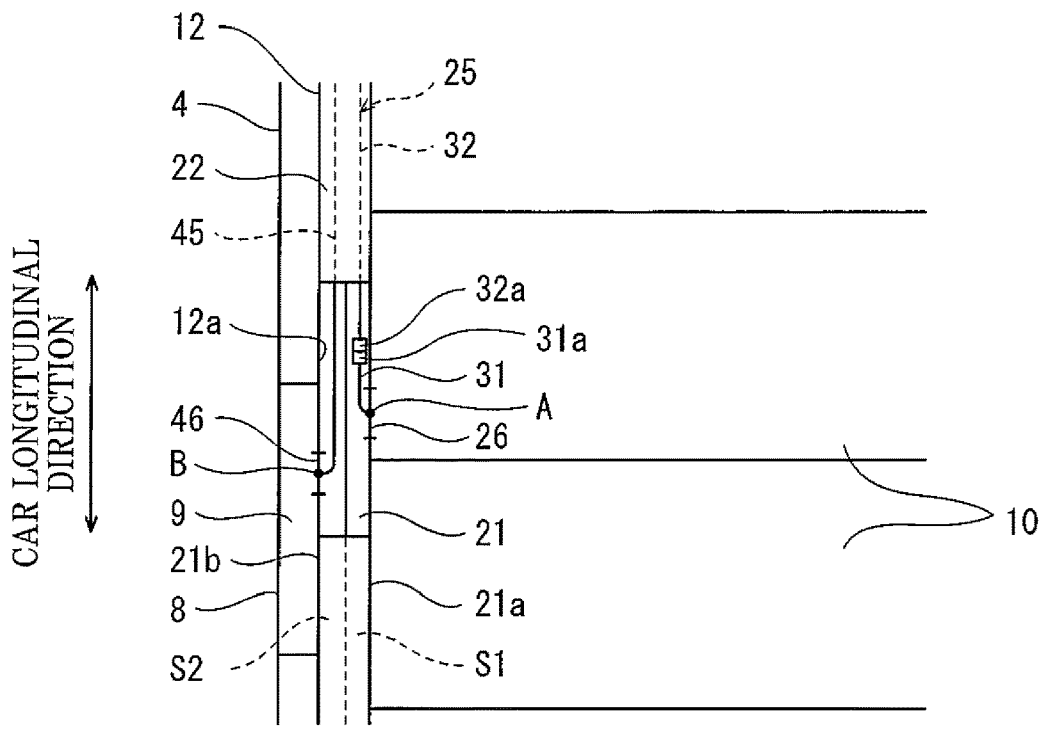
FIG. 4 is a plan view showing a threshold plate of the floor structure of FIG. 1 and its vicinity.

FIG. 2 is a sectional view showing major components of the floor structure 3 shown in FIG. 1. FIG. 3 is a perspective view showing major components of the floor structure 3 shown in FIG. 2. FIG. 4 is a plan view showing a threshold plate 9 of the floor structure 3 of FIG. 1 and its vicinity. It should be noted that the configurations of the first and second wiring ducts 12 and 13 are the same as each other although they are mirror-symmetrical. Therefore, in the following description, the first wiring duct 12 is mainly described. As shown in FIG. 2, the floor panels 10 and the wiring duct 12 are supported by a floor bodyshell 14 from below. Specifically, the floor bodyshell 14 includes a pair of side sills 15 (FIG. 2 shows only one side sill 15) and a cross beam 16. The side sills 15 are spaced apart from each other in the car width direction and extend in the car longitudinal direction. The cross beam 16 extends in the car width direction and couples the pair of side sills 15 to each other. The floor panels 10 and the wiring duct 12 are fixed to, for example, the cross beam 16. A spacer 17 is interposed between the floor panel 10 and the wiring duct 12, but the spacer 17 may be omitted.

As shown in FIG. 3, the wiring duct 12 has a flat and substantially rectangular solid shape that extends in the car longitudinal direction and has a vertical size shorter than a car width direction size. The wiring duct 12 includes a duct main body 21 and a lid 22. The duct main body 21 includes cable accommodating spaces S1 and S2 extending in the car longitudinal direction. The lid 22 closes the cable accommodating spaces S1 and S2 of the duct main body 21 from above. The duct main body 21 includes side wall portions 21a and 21b. The side wall portions 21a and 21b are located at both respective car width direction sides of the cable accommodating spaces S1 and S2 and extend in the car longitudinal direction. The duct main body 21 is fixed to a member (for example, the cross beam 16), provided under the duct main body 21, by fixtures 29, such as screws or bolts. However, the fixtures are not limited to these.

Below-described electricity supply cables 25 and the like are inserted in the cable accommodating spaces S1 and S2 in the car longitudinal direction so as to be arranged between the pair of side wall portions 21a and 21b. The cable accommodating space S1 and the side wall portion 21b are located close to the side bodyshell at a car body outer side, and the cable accommodating space S2 and the side wall portion 21a are located at a car body middle side. The cable accommodating spaces S1 and S2 formed in the duct main body 21 are continuously open upward over the entire length in the car longitudinal direction. The lid 22 has a flat plate shape. The lid 22 are detachably fixed to horizontal portions of the side wall portions 21a and 21b of the duct main body 21 by fixtures 23 (such as screws or bolts) to cover the cable accommodating spaces S1 and S2 from above. It should be noted that the shape of the lid 22 is not limited to the flat plate shape and may have an inverted U-shaped section. In FIG. 3, screw seats are provided on lower surfaces of horizontal portions of H shapes of the side wall portions 21a and 21b, and the lid 22 is fixed by using the fixtures 23 and the screw seats. However, the screw seats may not be used depending on the material and thickness of the duct main body.

With this, the electricity supply cables 25 do not have to be sequentially inserted in the cable accommodating spaces S1 and S2 in the car longitudinal direction, and the electricity supply cables 25 can be moved in parallel from an upper side to a lower side to be accommodated in the cable accommodating spaces S1 and S2. Therefore, the wiring duct 12 and the electricity supply cables 25 can be assembled so as to be stacked from a lower side in order. Thus, car assembling work is facilitated. Further, for example, when replacing the electricity supply cable 25, the lid 22 can be opened, and the electricity supply cable 25 can be detached only by being pulled upward. Thus, maintenance work is also facilitated.

A partition wall portion 21c that separates the cable accommodating space S1 and the cable accommodating space S2 from each other projects upward from a bottom wall portion 21d of the duct main body 21. An upper end height of the partition wall portion 21c is the same as each of upper end heights of the side wall portions 21a and 21b. Therefore, the lid 22 may be supported by not only the side wall portions 21a and 21b but also the partition wall portion 21c. It should be noted that the number of partition wall portions 21c may be set arbitrarily, and the partition wall portion 21c may be omitted. Further, the wiring duct 12 of the present embodiment has a substantially quadrangular sectional shape. However, the shape of the wiring duct 12 is not limited to this and may have an H-shaped section or a U-shaped section. In the present embodiment, the two cable accommodating spaces S1 and S2 are provided. The cable accommodating space S1 is a space for the electricity supply cables 25 extending to the heater-equipped floor panels, and the cable accommodating space S2 is a space for the wires of the electric heaters of the threshold plates at the entrances. However, two cable accommodating spaces do not necessarily have to be provided. The number of cable accommodating spaces may be one or may be three or more.

The electricity supply cables 25 supply electric power from a power supply apparatus (not shown) under a car floor through relay terminal blocks 36 to the electric heaters 11 (see FIG. 1) of the floor panels 10. The electricity supply cable 25 includes a power supply lead wire 31 and a relay cable 32. The power supply lead wire 31 is provided at the floor panels 10. The relay cable 32 is placed at the wiring duct 12 and extends to the relay terminal block 36 while being connected to the power supply lead wire 31. The power supply lead wire 31 is integrated with the floor panel 10 and projects from a side surface of the floor panel 10 which surface is located close to the wiring duct 12 and extends in the car longitudinal direction.

A wire insertion opening 26 through which the power supply lead wire 31 passes is formed at the side wall portion 21a of the duct main body 21, the side wall portion 21a being located close to the floor panel 10. The wire insertion opening 26 faces in the car width direction a connection portion A (see FIG. 4) where the electricity supply cable 15 (specifically, the power supply lead wire 31) and a side surface 10a of the floor panel 10 are connected to each other. With this, the electricity supply cable 25 can be arranged along a shortest route between the wiring duct 12 and the floor panel 10. In addition, since the curve of the electricity supply cable 25 can be made minimum, damage risk can be reduced.

The wire insertion opening 26 is open upward when the lid 22 is not fixed to the duct main body 21. Therefore, when assembling the electricity supply cable 25, the lid 22 can be detached, and the relay cable 32 can be moved in parallel from an upper side to a lower side to be inserted in the wire insertion opening 26. Thus, the ease of assembly work is excellent. As shown in FIG. 4, a connector 31a of the power supply lead wire 31 inserted in the wire insertion opening 26 is fitted and connected to a connector 32a of the relay cable 32 in the cable accommodating space S1 of the wiring duct 12.

An inspection hole 12a for access to the connectors 31a and 32a fitted and connected to each other is formed at an upper portion of the wiring duct 26 so as to be located right above the connectors 31a and 32a (i.e., right above a connection portion where the power supply lead wire 31 and the relay cable 32 are connected to each other). To be specific, the lid 22 is divided into plural parts lined up in a longitudinal direction of the duct main body 21. By detaching one of the parts of the lid 22, the inspection hole 12a is formed. A size of the inspection hole 12a in the car longitudinal direction is smaller than a size of the floor panel 10 in the car longitudinal direction. With this, the connectors 31a and 32a can be easily inspected through the inspection hole 12a. Further, by disconnecting the connectors 31a and 32a from each other, the heater-equipped floor panel 10 can be easily replaced without detaching the relay cable 32.

The relay terminal block 36 is supported by the side bodyshell 4 through a bracket 35. The relay terminal block 36 includes a positive input terminal 36a (input portion), a negative input terminal 36b (input portion), a positive output terminal 36c (output portion), and a negative output terminal 36d (output portion). A plus wire of a branch cable 41 extending from a main terminal block 37 (see FIGS. 2 and 5) is connected to the positive input terminal 36a, and a minus wire of the branch cable 41 is connected to the negative input terminal 36b. Plus wires of the plurality of relay cables 32 are connected to the positive output terminal 36c, and minus wires of the plurality of relay cables 32 are connected to the negative output terminal 36d. The positive input terminal 36a is electrically connected to the positive output terminal 36c, and the negative input terminal 36b is electrically connected to the negative output terminal 36d. To be specific, a branch circuit is formed by connecting a plurality of electric wires to each of the positive output terminal 36c and the negative output terminal 36d. It should be noted that each of the number of positive output terminals 36c and the number of negative output terminals 36d may be plural.

The relay terminal block 36 is arranged above the wiring duct 12 and between the wiring duct 12 and the side bodyshell 4. An opening portion 27 through which the relay cable 32 passes is formed at an upper wall portion (i.e., the lid 22) of the wiring duct 12. In the present embodiment, the opening portion 27 is formed by not providing the lid 22 at a portion through which the relay cable 32 is extended from the wiring duct 12 toward the relay terminal block 36 or by forming an opening at the lid 22. It should be noted that when there is an extra space, the opening portion 27 may be provided at the side wall portion 21b of the wiring duct 12, the side wall portion 21b being located close to the side bodyshell 4.

As shown in FIG. 2, an upper surface (i.e., an upper surface of the lid 22) of the wiring duct 12 and upper surfaces of the floor panels 10 are arranged on substantially the same flat plane. A floor mat 30 is placed on the floor panels 10 and the wiring duct 12 from above. To be specific, the upper surfaces of the floor panels 10 and the upper surface of the wiring duct 12 are flush with each other. Therefore, even when the floor mat 30 is directly placed on the upper surfaces of the floor panels 10 and the upper surface of the wiring duct 12, level differences are not formed.

The main terminal block 37 is supported by the side bodyshell 4 through a bracket 38. The structure of the main terminal block 37 is the same as the structure of the relay terminal block 36. To be specific, the main terminal block 37 includes a pair of input terminals 37a (input portion) and a pair of output terminals 37c (output portion). Main cables 42 extending from the power supply apparatus (not shown) provided under the car floor are connected to the pair of input terminals 37a, and a plurality of branch cables 41 are connected to the pair of output terminals 37c. As with the relay terminal block 36, the main terminal block 37 is provided above the wiring duct 12 and between the wiring duct 12 and the side bodyshell 4. It should be noted that the branch cable 41 extending from the relay terminal block 36 to the main terminal block 37 may pass through the inside of a car body side wall or may pass through the inside of the wiring duct 12. Further, the main terminal block 37 or the relay terminal block 36 may be arranged in the car body side wall, under the seats, or in an apparatus box.

A through pipe 43 is provided at the underframe 14 so as to penetrate the underframe 14 from a lower side of the car floor to an upper side of the car floor. To be specific, an upper end portion of the through pipe 43 is arranged in a space in which the main terminal block 37 is arranged. Specifically, the through pipe 43 is fixed to the underframe 14 while being inserted in a through hole 15a formed at the side sill 15. The main cables 42 pass through the through pipe 43 to connect the power supply apparatus (not shown) under the car floor to the main terminal block 37 above the car floor. According to this configuration, the wires can be collected in the vicinity of the side bodyshell 4. Therefore, a space for collecting the wires for the floor panels 10 does not have to be formed under the car floor.

As shown in FIG. 4, the threshold plate 9 (door sill) as a lower edge of the door opening portion 8 is provided at the door opening portion 8 of the car body 2. An electric heater is incorporated in the threshold plate 9. An electricity supply cable 45 extends from the threshold plate 9 inward in the car width direction. The wiring duct 12 extends between the end portion of the floor panel 10 and the door opening portion 8. As with the wire insertion opening 26 of the side wall portion 21a, a wire insertion opening 46 is formed at the side wall portion 21b of the wiring duct 12, the side wall portion 21b being located at an outer side in the car width direction (the side wall portion 21b being located close to the threshold plate 9). The wire insertion opening 46 faces in the car width direction a connection portion B where the threshold plate 9 and the electricity supply cable 45 are connected to each other. The electricity supply cable 45 of the threshold plate 9 passes through the wire insertion opening 46 and is inserted in the wiring duct 12 in the car longitudinal direction. It should be noted that other cables and the like in addition to the electricity supply cables 25 and 45 may be inserted in the wiring duct 12. The threshold plate 9 may be a threshold plate in which an electric heater is not incorporated, and in this case, the electricity supply cable 45 does not exist.

Figure 5:
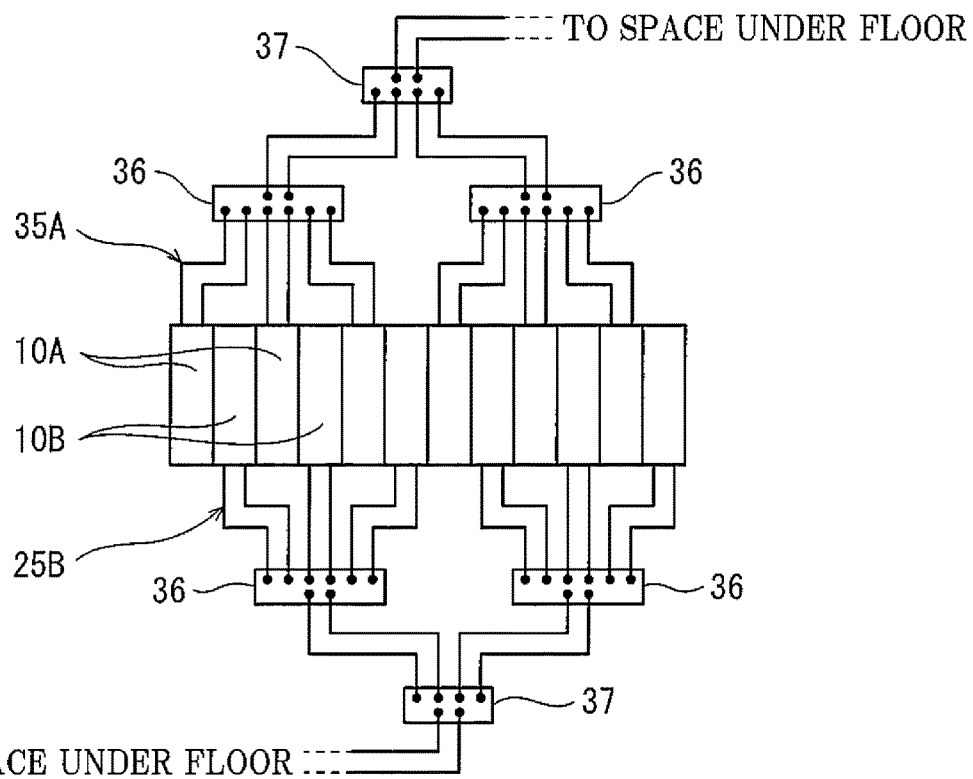
FIG. 5 is a wiring diagram of the floor structure shown in FIG. 1.

FIG. 5 is a wiring diagram of the floor structure 3 shown in FIG. 1. As shown in FIG. 5, the electricity supply cables 25 passing through the first wiring duct 12 (see FIG. 1) are referred to as first electricity supply cables 25A, and the electricity supply cables 25 passing through the second wiring duct 13 (see FIG. 1) are referred to as second electricity supply cables 25B. Some of all the floor panels 10 are referred to as first floor panels 10A, and the other floor panels 10 are referred to as second floor panels 10B. In the example of FIG. 5, when counting the floor panels 10 in order from one end in the car longitudinal direction, odd-numbered floor panels are referred to as the first floor panels 10A, and even-numbered floor panels are referred to as the second floor panels 10B.

The first electricity supply cables 25A are connected to first car width direction end portions of the first floor panels 10A, and electric power is supplied through the first electricity supply cables 25A to the first floor panels 10A. The second electricity supply cables 25B are connected to second car width direction end portions of the second floor panels 10B, and electric power is supplied through the second electricity supply cables 25B to the second floor panels 10B. As above, since the wiring ducts 12 and 13 form two routes, each electricity supply cable 25 can be arranged through a route suitable for a wiring position (left or right position) of each floor panel 10. In addition, for example, a temperature command to the first floor panel 10A and a temperature command to the second floor panel 10B can be easily made different, and an on-off state of the first floor panel 10A and an on-off state of the second floor panel 10B can be easily made different. It should be noted that according to the above configuration, the wiring ducts 12 and 13 and the electricity supply cables 25 are arranged at both car width direction sides of the floor panels 10. However, the wiring ducts and the electricity supply cables may be arranged at only one car width direction side of the floor panels 10.

Embodiment 2

Figure 6:
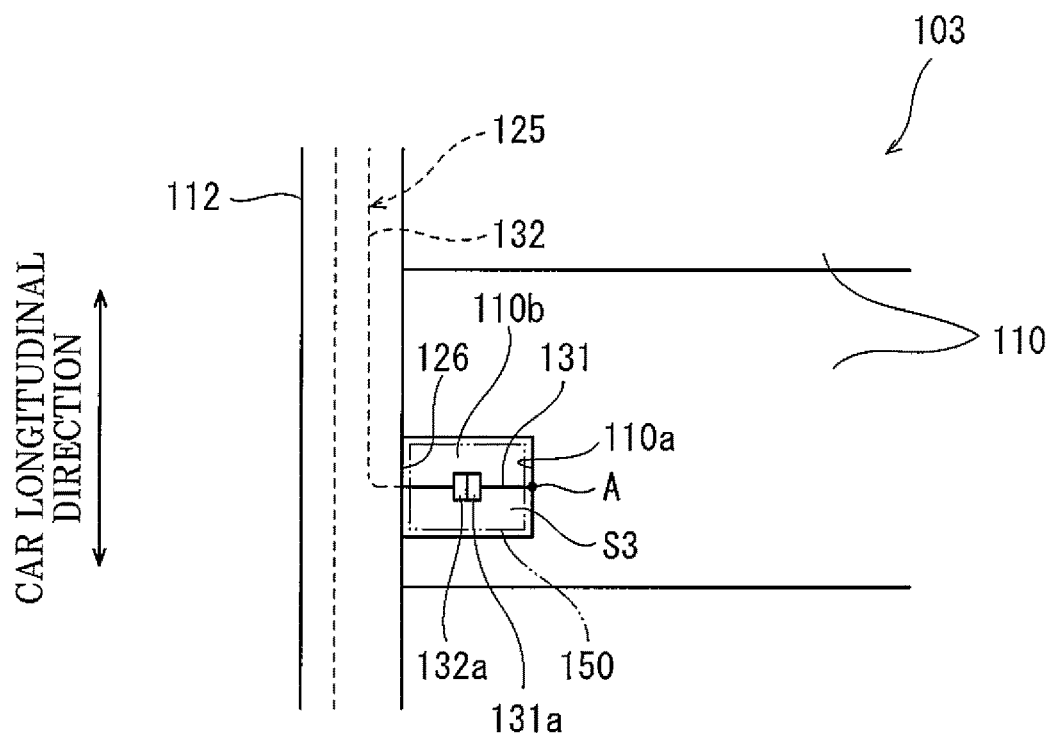
FIG. 6 is a plan view showing an inspection hole of the floor structure according to Embodiment 2 and its vicinity.

FIG. 6 is a plan view showing an inspection hole 110a of a floor structure 103 according to Embodiment 2 and its vicinity. As shown in FIG. 6, a cutout space S3 that is open toward a wiring duct 112 is formed at a floor panel 110. A power supply lead wire 131 projects from a side surface 110a which is one of surfaces forming the cutout space S3, faces the wiring duct 112, and extends along the car longitudinal direction. A connector 131a is provided at a tip end of the power supply lead wire 131. A wire insertion opening 126 formed at a side wall portion of the wiring duct 112 which portion is located close to the floor panel 110 faces the cutout space S3 of the floor panel 110 in the car width direction. To be specific, the wire insertion opening 126 faces in the car width direction to a connection portion A where the power supply lead wire 131 of an electricity supply cable 125 and the side surface 110a of the floor panel 110 are connected to each other. A relay cable 132 accommodated in the wiring duct 112 passes through the wire insertion opening 126, and a connector 132a provided at a tip end of the relay cable 132 is fitted and connected to the connector 131a in the cutout space S3. The relay cable 132 can be inserted in the cutout space S3. The cutout space S3 may be waterproofed by: winding a rubber plate around part of the relay cable 132; putting sponge in the cutout space S3; and filling the cutout space S3 with a sealing agent.

An inspection hole 110b for access to the connectors 131a and 132a is formed at an upper portion of the floor panel 110 so as to be located right above the connectors 131a and 132a. The inspection hole 110b is closed by a detachable cap 150. With this, the connectors 131a and 132a can be easily inspected through the inspection hole 110b by detaching the cap 150, and the heater-equipped floor panel 110 can also be easily replaced. It should be noted that since the other components are the same as those of Embodiment 1, explanations thereof are omitted.

Embodiment 3

Figure 7:
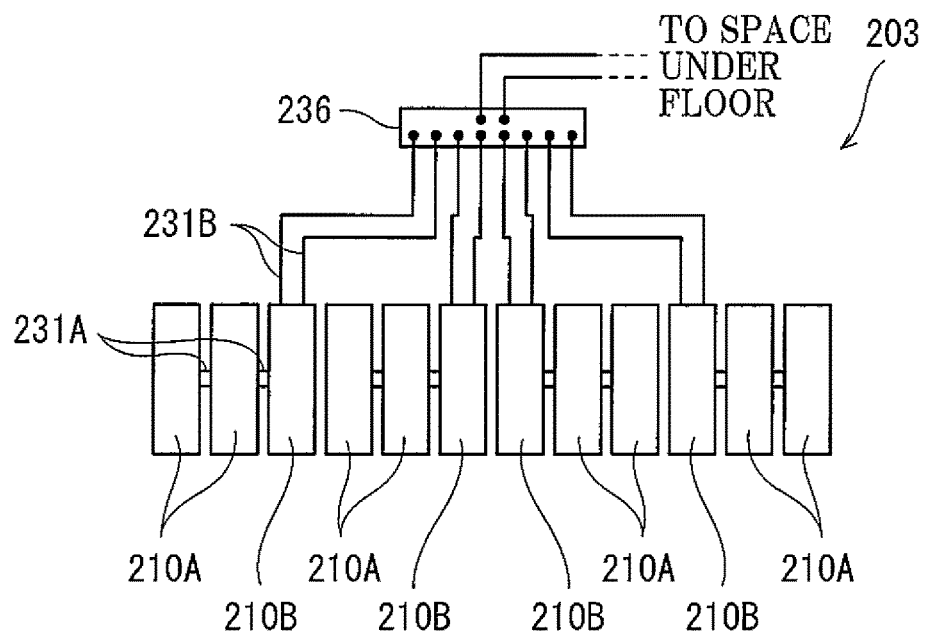
FIG. 7 is a wiring diagram of the floor structure according to Embodiment 3.

FIG. 7 is a wiring diagram of a floor structure 203 according to Embodiment 3. As shown in FIG. 7, each of first floor panels 210A among the heater-equipped floor panels includes relay lead wires 231A which extend from one of car width direction side surfaces of the first floor panel 210A, are inserted in the wiring duct 21, and are connected to the adjacent floor panel in series. Each of second floor panels 210B among the heater-equipped floor panels includes power supply lead wires 231B which extend from one of car width direction side surfaces of the second floor panel 201B and pass through the wiring duct 12 (see FIG. 2). As with Embodiment 1, the power supply lead wires 231B are connected to a terminal block 236 through relay cables passing through the wiring duct 12. According to this configuration, the number of electricity supply cables passing through the wiring duct 12 can be reduced. It should be noted that since the other components are the same as those of Embodiment 1, explanations thereof are omitted. In the present embodiment, the relay lead wires 231A extend from one of the car width direction side surfaces of the first floor panel 210A, pass through the wiring duct 21, and are connected to the adjacent floor panel in series. However, the relay lead wires 231A may extend from one of car longitudinal direction side surfaces of the first floor panel 210A and may be directly connected to the adjacent floor panel in series without passing through the wiring duct 21.

REFERENCE SIGNS LIST 1 railcar
3, 103, 203 floor structure
4, 5 side bodyshell
8 door opening portion
10, 110, 210 floor panel
10b inspection hole
11 electric heater
12, 13, 112 wiring duct
21 duct main body
21a, 21b side wall portion
22 lid
25, 125 electricity supply cable
26 wire insertion opening
27 opening portion
31, 131, 231B power supply lead wire
32, 132, 231A relay cable
36 relay terminal block
37 main terminal block
42 main cable
43 through pipe
112a inspection hole
C passenger room
S1, S2 cable accommodating space

The invention claimed is:

1. A railcar floor structure comprising:
a plurality of floor panels arranged over an entire length of a passenger room of a railcar in a car longitudinal direction and including respective electric heaters;
a wiring duct extending in the car longitudinal direction and arranged between a side bodyshell and car width direction end portions of the floor panels;
an electricity supply cable arranged at the wiring duct, electric power being supplied to the electric heaters through the electricity supply cable;
a wire insertion opening formed at a side wall portion of the wiring duct, the side wall portion being located close to the floor panels and extending along the car longitudinal direction, the electricity supply cable passing through the wire insertion opening;
a through pipe provided under a floor, a main cable passing through the through pipe, electric power being supplied through the main cable; and
a terminal block provided above a lower surface of the wiring duct and between the wiring duct and the side bodyshell and including an input portion and an output portion, wherein:
the electricity supply cable includes a plurality of electricity supply cables connected to the output portion; and
the wiring duct further includes an opening portion provided at an upper wall portion of the wiring duct or a side wall portion of the wiring duct, the side wall portion being located close to the side bodyshell, the electricity supply cables passing through the opening portion.

2. The railcar floor structure according to claim 1, wherein:
the side bodyshell includes a door opening portion at the passenger room; and
the wiring duct passes through between the door opening portion and the end portions of the floor panels and extends over the entire length of the passenger room in the car longitudinal direction.

3. The railcar floor structure according to claim 1, wherein:
the electricity supply cable extends from a side surface of at least one of the plurality of floor panels, the side surface being located close to the wiring duct; and
the wire insertion opening faces a connection portion where the electricity supply cable and the side surface of the floor panel are connected to each other.

4. The railcar floor structure according to claim 1, wherein the electricity supply cable includes at least one of:
a power supply lead wire provided at at least one of the plurality of floor panels; and
a relay cable connected to the power supply lead wire and placed at the wiring duct.

5. The railcar floor structure according to claim 4, wherein an inspection hole is formed at an upper portion of the wiring duct or an upper portion of the floor panel so as to be located right above a connection portion where the power supply lead wire and the relay cable are connected to each other, the inspection hole allowing access to the connection portion.

6. The railcar floor structure according to claim 4, wherein the floor panel includes the power supply lead wire extending from a side surface of the floor panel, the side surface being located close to the wiring duct and extending along the car longitudinal direction.

7. The railcar floor structure according to claim 4, wherein:
each of some of the plurality of floor panels includes a relay lead wire connected to an adjacent floor panel in series; and
each of the other floor panels includes the power supply lead wire.

8. The railcar floor structure according to claim 1, wherein an upper surface of the wiring duct and upper surfaces of the floor panels are arranged on a substantially same flat plane.

9. The railcar floor structure according to claim 1, wherein:
a cable accommodating space of the wiring duct is open upward continuously in the car longitudinal direction; and
the wiring duct includes a lid configured to close the cable accommodating space from above.

10. The railcar floor structure according to claim 1, wherein:
the side bodyshell includes a first side bodyshell provided at one of car width direction sides and a second side bodyshell provided at the other car width direction side;
the wiring duct includes a first wiring duct arranged between the first side bodyshell and first car width direction end portions of the floor panels and a second wiring duct arranged between the second side bodyshell and second car width direction end portions of the floor panels;
the electricity supply cable includes a first electricity supply cable passing through the first wiring duct and a second electricity supply cable passing through the second wiring duct; and
the plurality of floor panels includes a first floor panel supplied with electric power through the first electricity supply cable and a second floor panel supplied with electric power through the second electricity supply cable.

* * * * *